(12) United States Patent
Gunther et al.

(10) Patent No.: US 9,931,688 B2
(45) Date of Patent: Apr. 3, 2018

(54) BLIND TACK BOLT WITH HIGHER CLAMP-UP STRENGTH

(71) Applicant: The Boeing Company, Chicago, IL (US)

(72) Inventors: Scott William Gunther, Seattle, WA (US); Edward John Batt, Bothell, WA (US); Farahnaz Sisco, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 228 days.

(21) Appl. No.: 14/672,794

(22) Filed: Mar. 30, 2015

(65) Prior Publication Data

US 2015/0275953 A1 Oct. 1, 2015

Related U.S. Application Data

(60) Provisional application No. 61/973,360, filed on Apr. 1, 2014.

(51) Int. Cl.
| | |
|---|---|
| F16B 19/05 | (2006.01) |
| B21J 15/04 | (2006.01) |
| B23P 25/00 | (2006.01) |
| F16B 19/10 | (2006.01) |

(52) U.S. Cl.
CPC ............ B21J 15/043 (2013.01); B23P 25/00 (2013.01); F16B 19/1054 (2013.01); Y10T 29/49799 (2015.01)

(58) Field of Classification Search
CPC ..... B21J 15/043; F16B 19/1054; B23P 25/00; Y10T 29/49799
See application file for complete search history.

(56) References Cited

U.S. PATENT DOCUMENTS

| | | | |
|---|---|---|---|
| 2,114,493 A | 4/1938 | Huck | |
| 2,787,932 A * | 4/1957 | Morton | ............... F16B 19/1054 |
| | | | 411/34 |
| 4,810,142 A | 3/1989 | Briles | |
| 5,651,649 A * | 7/1997 | Sadri | ................... F16B 19/1054 |
| | | | 411/34 |
| 6,077,009 A * | 6/2000 | Hazelman | .............. B21J 15/043 |
| | | | 411/34 |

FOREIGN PATENT DOCUMENTS

GB   2202293   9/1988

OTHER PUBLICATIONS

European Patent Office; Extended European Search Report for Application No. 15162156.2 dated Sep. 3, 2015.

* cited by examiner

*Primary Examiner* — David Bryant
*Assistant Examiner* — Lee A Holly
(74) *Attorney, Agent, or Firm* — Parsons Behle & Latimer

(57) ABSTRACT

A blind tack fastener includes a pull stem having an elongated shaft with an extended tail portion. The blind tack fastener also includes a crush-initiating washer, a crush sleeve, and a swage collar, surrounding the elongated shaft of the pull stem. The elongated shaft has a breakaway groove configured to create a predictive fracture point below the head-end surface of the swage collar, such that a hole in the swage collar serves as a centering lead-in for a drill that can be used to remove the blind tack fastener.

20 Claims, 3 Drawing Sheets

BLIND TACK BOLT WITH HIGHER CLAMP-UP STRENGTH

CROSS REFERENCE TO RELATED APPLICATIONS

This application claims the benefit of U.S. Provisional Patent Application Ser. No. 61/973,360, filed Apr. 1, 2014, the disclosure of which is incorporated by reference herein in its entirety.

FIELD OF THE DISCLOSURE

The present disclosure relates generally to tack fasteners and, in particular, to blind tack fasteners utilized to fasten components of a workpiece together to perform manufacturing operations on the workpiece.

BACKGROUND

In many environments it is desirable to temporarily hold and clamp parts together while other operations, such as drilling and riveting operations, are performed. For example, in the aircraft industry, it is becoming increasingly desirable to perform the drilling of holes and insertion of fasteners using a one-up assembly process. Traditionally, many parts are subject to disassembly after drilling to clean and deburr the parts, resulting in increased labor hours, and often creating damage to the components induced during disassembly and rework associated with mismatched holes after disassembly.

A one-up assembly process, by contrast, involves drilling and fastening multiple layers of a workpiece at one time, without having to disassemble the parts for other operations, such as deburring, cleaning, sealing, and other suitable operations. The layers may be parts of a workpiece that are to be fastened to each other, such as, for example, a skin panel to be fastened to a spar or spar cap, or a skin panel to be attached to a frame of a fuselage. Future production strategies contemplate a "lights out" one-up assembly process, which involves more automation and less human involvement than traditional manufacturing processes.

Tack fasteners are widely used in the aircraft industry to attach the parts of a workpiece together temporarily to perform operations on a workpiece. Since it is time consuming and sometimes difficult (and, therefore, expensive) to fasten parts together temporarily using conventional mechanical devices, such as nuts and bolts, tack fasteners have been developed to avoid these problems.

While various tack fasteners have been developed, "blind" tack fasteners (i.e., fasteners that can be fully installed from a single side of a structural assembly) are frequently desirable, at least in the aircraft industry. Pop rivets and one-sided installation (OSI) bolts are two known types of blind fasteners. Frequently, tack fasteners are made out of relatively soft metals, such as aluminum, to allow the tack fasteners to be removed easily by drilling once the desired operations have been completed on the workpiece. Although tack fasteners made of soft metals can be removed easily, one disadvantage of such tack fasteners is that they may not provide sufficient clamp-up force to attach certain parts together, particularly in an automated one-up assembly process.

In the past, designers have employed various approaches to address this disadvantage. For example, in some cases, such nuts and bolts have been utilized in regions where high clamp-up forces are desired. However, the installation of nuts and bolts is time consuming, and frequently involves the services of two workers, rather than a single worker. Another approach has been to utilize a large number of closely spaced tack fasteners, but this approach often involves many more fasteners and much more labor than desired. Yet another approach has been to utilize tack fasteners made of a harder material, such as steel (e.g., the Blind Bolt marketed by ALLFAST Fastening Systems, Inc. in City of Industry, Calif., or the Maxibolt® Blind Bolt system marketed by Cherry Aerospace in Santa Ana, Calif.). While such tack fasteners may exhibit a higher clamp-up force than aluminum fasteners, the harder material makes the fasteners more difficult to remove by drilling without damaging drill bits.

SUMMARY

The present disclosure describes a new and improved blind tack fastener, which can be made of a relatively soft material, such as aluminum, yet still exhibits higher clamp-up strength than traditional tack fasteners.

In one example, a blind tack fastener comprises a pull stem having an elongated shaft with an extended tail portion, the elongated shaft having a first outer surface with a first outer diameter, the extended tail portion having a second outer surface with a second outer diameter larger than the first outer diameter, the extended tail portion also having a fillet. The blind tack fastener further comprises a crush-initiating washer surrounding the pull stem, the crush-initiating washer having a head-end surface, a fillet engagement surface in contact with the fillet of the extended tail portion of the elongated shaft, an inner surface in contact with the first outer surface of the first portion of the elongated shaft, and an outer surface with an outer diameter substantially equal to the second outer diameter of the extended tail portion of the elongated shaft. The blind tack fastener further comprises a crush sleeve surrounding the pull stem, the crush sleeve having a head-end surface, a tail-end surface in contact with the head-end surface of the crush-initiating washer, an inner surface in contact with the first outer surface of the first portion of the elongated shaft, and an outer surface with an outer diameter substantially equal to the second outer diameter of the extended tail portion of the elongated shaft. The blind tack fastener further comprises a swage collar surrounding the pull stem, the swage collar having a tail-end surface in contact with the head-end surface of the crush sleeve, an inner surface in contact with the first outer surface of the first portion of the elongated shaft, and an outer surface with an outer diameter larger than the second outer diameter of the extended tail portion of the elongated shaft.

The blind tack fastener may further comprise a breakaway groove in the elongated shaft of the pull stem, the breakaway groove being located within the swage collar. The blind tack fastener may further comprise a plurality of lock grooves on the outer surface of the elongated shaft of the pull stem, the lock grooves being located within the swage collar. The pull stem may comprise aluminum or an aluminum alloy having a yield strength greater than about 60 ksi and a machinability rating greater than about 40%. The crush-initiating washer may comprise high-alloy steel having a yield strength greater than about 150 ksi. The crush sleeve may comprise aluminum, copper or an alloy having a yield strength less than about 20 ksi and a ductility greater than about 15%. The swage collar may comprise aluminum or an aluminum alloy having a yield strength less than about 20 ksi. The head-end surface of the crush-initiating washer and the tail-end surface of the crush sleeve may be tapered toward the elongated shaft.

In another example, a system comprises a workpiece comprising a first part and a second part, the workpiece having a first hole extending through both the first part and the second part. The system further comprises a blind tack fastener comprising an aluminum pull stem and an aluminum crush sleeve inserted in the first hole, the tack fastener comprising a swage collar in contact with the first part of the workpiece and a bulb formed in a portion of the aluminum crush sleeve, the bulb contacting the second part of the workpiece. The blind tack fastener exerts a clamp-up force of at least 300 pounds on the workpiece.

The workpiece may comprise more than two parts. The pull stem may be recessed within a hole located in a head-end surface of the swage collar. The aluminum pull stem may have a yield strength greater than about 60 ksi and a machinability rating greater than about 40%. The blind tack fastener may comprise a crush-initiating washer made of high-alloy steel having a yield strength greater than about 150 ksi. The aluminum crush sleeve may have a yield strength less than about 20 ksi and a ductility greater than about 15%. The swage collar may comprise aluminum or an aluminum alloy having a yield strength less than about 20 ksi.

In another example, a method of processing a workpiece comprising a plurality of parts with a hole extending through the workpiece is disclosed. The method comprises inserting a pull stem and a crush sleeve of a blind tack fastener through the hole in the workpiece such that a swage collar of the blind tack fastener is located on a first side of the workpiece and a crush-initiating washer of the blind tack fastener is located on a second side of the workpiece. The method further comprises pulling the pull stem of the blind tack fastener to form a bulb in the crush sleeve of the blind tack fastener, thereby compressing the parts of the workpiece between the swage collar and the bulb in the crush sleeve. The method further comprises breaking the pull stem below a head-end surface of the swage collar, performing one or more manufacturing operations on the workpiece, and removing the blind tack fastener by drilling the pull stem through a hole in the head-end surface of the swage collar.

The method may further comprise swaging the swage collar onto lock grooves located in an outer surface of the pull stem. The method may further comprise centering a drill bit over the pull stem in the hole in the head-end surface of the swage collar prior to drilling the pull stem.

BRIEF DESCRIPTION OF THE DRAWINGS

Like reference numbers and designations in the various drawings indicate like elements.

DETAILED DESCRIPTION

The present disclosure describes a new and improved blind tack fastener, which can be made of a relatively soft material, such as aluminum, yet still exhibits higher clamp-up strength than traditional tack fasteners.

Figure 1A:
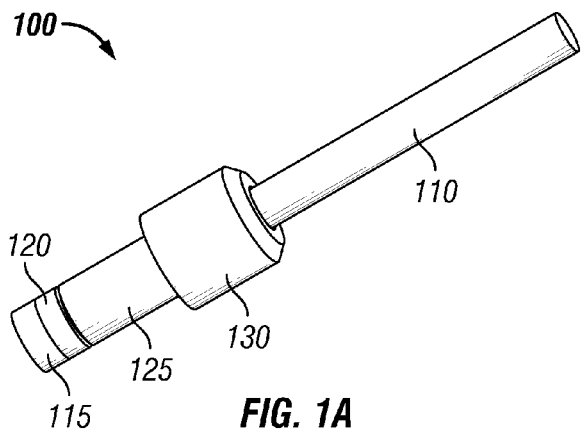
FIGS. 1A-1B illustrate a perspective view and an exploded perspective view, respectively, of one example of a blind tack fastener in accordance with the present disclosure.
Figure 1B:
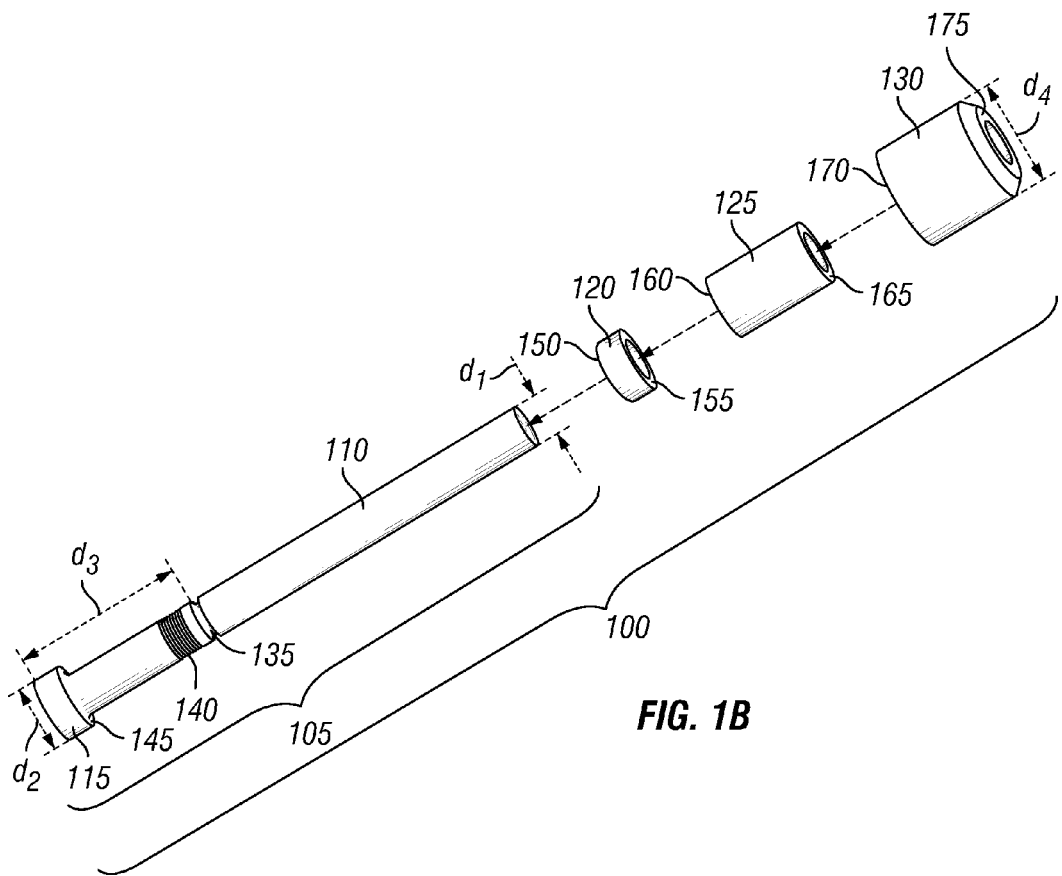

FIG. 1A illustrates a perspective view and FIG. 1B illustrates an exploded perspective view of one example of a blind tack fastener 100 in accordance with the present disclosure. In the illustrated example, the blind tack fastener 100 comprises a pull stem 105 having an elongated shaft 110 with an extended tail portion 115 located at a tail end of the fastener 100. The blind tack fastener 100 further comprises a crush-initiating washer 120 surrounding a portion of the elongated shaft 110 of the pull stem 105, adjacent to the extended tail portion 115 of the pull stem 105, and a crush sleeve 125 surrounding a portion of the elongated shaft 110 of the pull stem 105, adjacent to the crush-initiating washer 120. In addition, the blind tack fastener 100 comprises a swage collar 130 surrounding a portion of the elongated shaft 110 of the pull stem 105, adjacent to the crush sleeve 125.

As shown in FIG. 1B, the elongated shaft 110 of the pull stem 105 has an outer surface with a first outer diameter, $d_1$, and the extended tail portion 115 has an outer surface with a second outer diameter, $d_2$, which is larger than the first outer diameter, $d_1$. The elongated shaft 110 also includes a breakaway groove 135 located at a selected distance, $d_3$, from the extended tail portion 115 of the pull stem 105, as well as a plurality of annular lock grooves 140 located between the extended tail portion 115 and the breakaway groove 135. The extended tail portion 115 also has a rounded shoulder surface or fillet 145, which contacts a complementary fillet engagement surface 150 of the crush-initiating washer 120. The fillet 145 of the extended tail portion 115 is configured to relieve stress between the pull stem 105 and the crush-initiating washer 120 during installation of the blind tack fastener 100. Preferably, the pull stem 105 is made of a material having a relatively high yield strength and machinability rating. For example, in some cases, the pull stem 105 may comprise an aluminum pull stem made of aluminum or an aluminum alloy having a yield strength greater than about 60 ksi and a machinability rating greater than about 40%.

The crush-initiating washer 120 has an inner surface that contacts the outer surface of the elongated shaft 110 and an outer surface with an outer diameter substantially equal to the second outer diameter, $d_2$, of the extended tail portion 115 of the elongated shaft 110. In addition, the crush-initiating washer 120 has a head-end surface 155, which contacts and engages a tail-end surface 160 of the crush sleeve 125. As shown in the cross-sectional view of FIG. 2D, the head-end surface 155 of the crush-initiating washer 120 and the tail-end surface 160 of the crush sleeve 125 are tapered toward the elongated shaft 110, to enhance bulb formation in the crush sleeve 125 during installation of the blind tack fastener 100. Preferably, the crush-initiating washer 120 is made of a material having a high yield strength. For example, in some cases, the crush-initiating washer 120 is made of high-alloy steel having a yield strength greater than about 150 ksi.

The crush sleeve 125 has an inner surface that contacts the outer surface of the elongated shaft 110, and an outer surface with an outer diameter substantially equal to the second outer diameter, $d_2$, of the extended tail portion 115 of the elongated shaft 110. In addition, the crush sleeve 125 has a head-end surface 165, which contacts and engages a tail-end surface 170 of the swage collar 130. Preferably, the crush sleeve 125 is made of a material having a relatively low yield strength and a relatively high ductility. For example, in some cases, the crush sleeve 125 may comprise an aluminum crush sleeve made of aluminum or a suitable alloy having a yield strength less than about 20 ksi and a ductility greater than about 15%. In other cases, the crush sleeve 125 may be made of copper or another suitable alloy demonstrating similar characteristics.

The swage collar 130 has an inner bore with a smooth inner surface that interfaces with the lock grooves 140 of the elongated shaft 110 with a clearance fit. The swage collar 130 also has an outer surface with an outer diameter, $d_4$, larger than the second outer diameter, $d_2$, of the extended tail portion 115 of the elongated shaft 110. Thus, the tail-end surface 170 of the swage collar 130 extends beyond the head-end surface 165 of the crush sleeve 125, creating an annular lip surrounding the head-end surface 165 of the crush sleeve 125. Preferably, the swage collar 130 is made of a material having a relatively low yield strength. For example, in some cases, the swage collar 130 is made of aluminum or an aluminum alloy having a yield strength less than about 20 ksi.

Figure 2A:
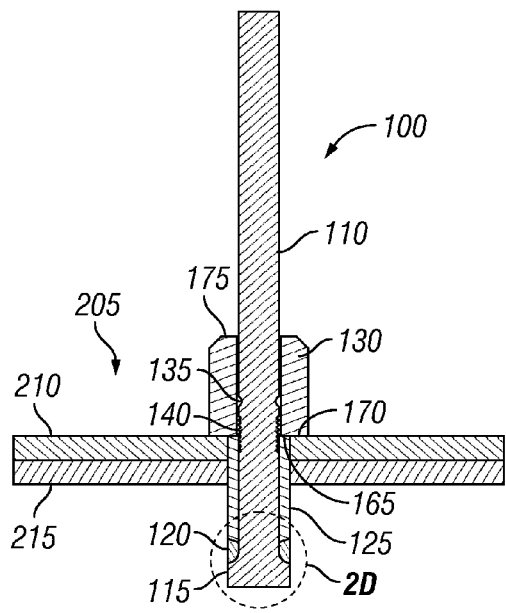
FIGS. 2A-2D illustrate side cross-sectional views showing one example of a method for utilizing the blind tack fastener of FIG. 1 to attach two parts of a workpiece together.
Figure 2B:
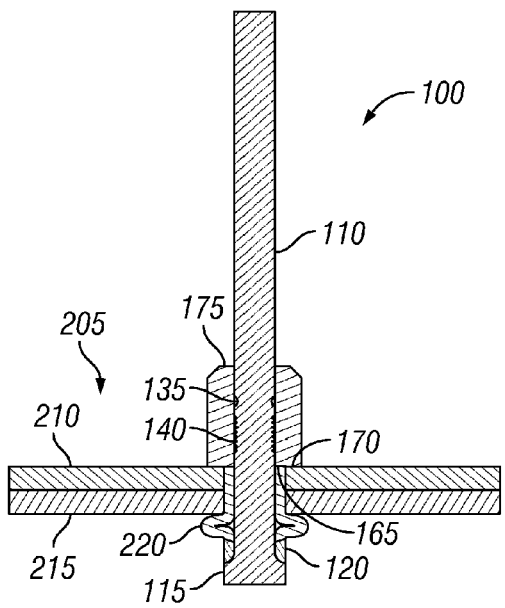
Figure 2C:
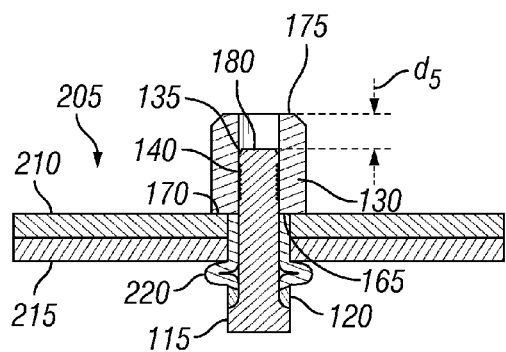
Figure 2D:
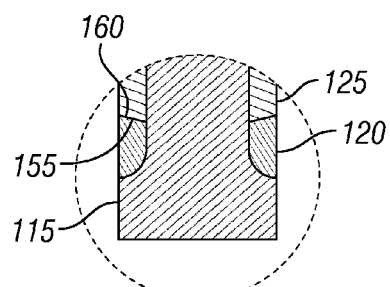

FIGS. 2A-2D illustrate side cross-sectional views showing one example of a method for utilizing the blind tack fastener 100 of FIG. 1 to attach a first part 210 and a second part 215 of a workpiece 205 together. In a first step, as shown in FIG. 2A, the tail end of the blind tack fastener 100 is inserted through aligned holes in the first part 210 and the second part 215 of the workpiece 205. The swage collar 130 is located on a first side of the workpiece 205, with the annular lip on the tail-end surface 170 of the swage collar 130 abutting an outer surface of the first part 210 of the workpiece. At the same time, the extended tail portion 115 of the pull stem 105, the crush-initiating washer 120 and a portion of the crush sleeve 125 protrude through the holes to the other side of the workpiece 205.

In a next step, as shown in FIG. 2B, a tool (not shown) is used to the pull the elongated shaft 110 of the pull stem 105, which compresses the crush-initiating washer 120 against the crush sleeve 125. As discussed above, the fillet 145 of the extended tail portion 115 provides stress relief at the interface between the pull stem 105 and the crush-initiating washer 120 while the pull stem 105 is being pulled. In addition, the inward taper of the head-end surface 155 of the crush-initiating washer 120 and the tail-end surface 160 of the crush sleeve 125 facilitate bulb formation in the crush sleeve 125 during this step. As a result, a bulb 220 is formed in the crush sleeve 120 as the pull stem 105 is being pulled. This bulb 220, in turn, interacts with the annular lip on the tail-end surface 170 of the swage collar 130 to compress the first part 210 and the second part 215 of the workpiece 205 together until the desired clamp-up force is achieved. The swage collar 130 may then be swaged onto the lock grooves 140 of the pull stem 105 using a variety of suitable swaging tools and methods that are well-known to those of ordinary skill in the art.

In a next step, as shown in FIG. 2C, the elongated shaft 110 of the pull stem 105 may be severed at the predictive fracture point created by the breakaway groove 135. The remaining portion of the elongated shaft 110 has a length, $d_3$, which is preferably selected such that the broken head-end surface 180 of the elongated shaft 110 is positioned below the head-end surface 175 of the swage collar 130 by a selected offset distance, $d_5$. As a result, the hole in the swage collar 130 can advantageously serve as a centering lead-in for a drill that can be used in a subsequent step (not shown) to remove the blind tack fastener 100, once the desired manufacturing operations have been performed on the workpiece 205. In some cases, for example, the offset distance, $d_5$, is selected such that a 135° drill tip can be inserted into the hole in the swage collar 130 and the full diameter of the drill bit contacts the swage collar 130 before the drill tip makes contact with the broken head-end surface 180 of the elongated shaft 110. This configuration advantageously facilitates removing the blind tack fastener 100 by drilling the pull stem 105 through the hole in the head-end surface 175 of the swage collar 130, thereby enabling the blind tack fastener 100 to be drilled out automatically and replaced with a permanent fastener, without requiring human interaction.

The blind tack fastener 100 of the present disclosure is advantageously configured such that it can exert a relatively high clamp-up force on the first part 210 and the second part 215 of the workpiece 205. In some cases, for example, the blind tack fastener 100 can exert a clamp-up force of at least about 300 pounds on the workpiece 205. In other cases, the blind tack fastener 100 can exert a clamp-up force of at least about 400 pounds on the workpiece 205. These high clamp-up forces are sufficient to support an automated one-up assembly process on the workpiece 205. The blind tack fastener 100 advantageously eliminates the need for two employees to install and remove two-sided tack fasteners that exhibit high clamp-up force (e.g., nuts and bolts), which decreases assembly cycle time and labor.

Figure 3:
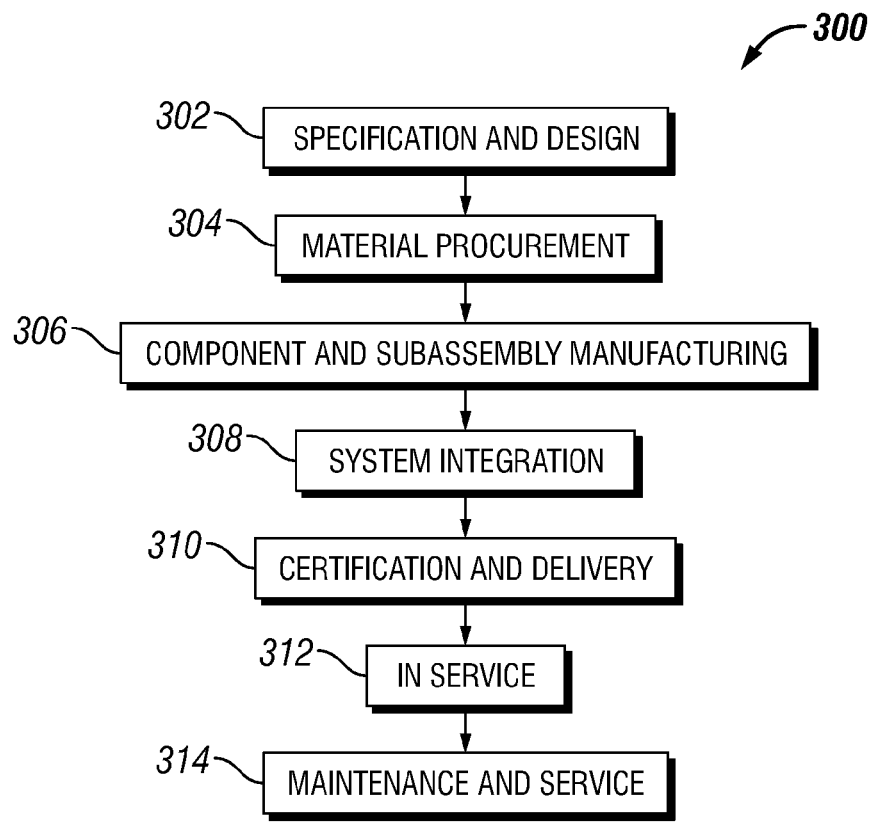
FIG. 3 illustrates a flow diagram of an aircraft production and service methodology.
Figure 4:
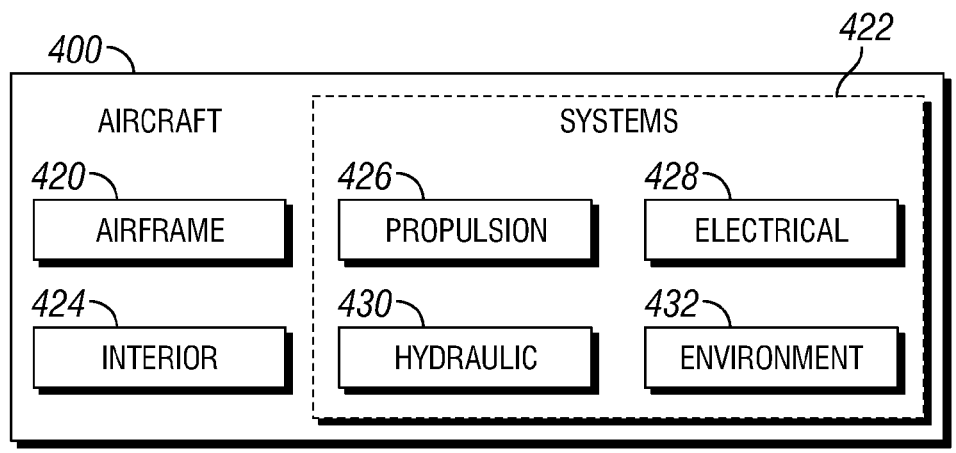
FIG. 4 illustrates a block diagram of an aircraft.

Referring to FIGS. 3-4, the systems and methods of the present application may be implemented in the context of an aircraft manufacturing and service method 300 as shown in FIG. 3 and an aircraft 400 as shown in FIG. 4. During pre-production, exemplary method 300 may include specification and design 302 of the aircraft 400 and material procurement 304. During production, component and subassembly manufacturing 306 and system integration 308 of the aircraft 400 takes place. Thereafter, the aircraft 400 may go through certification and delivery 310 in order to be placed in service 312. While in service 312 by a customer, the aircraft 400 is scheduled for routine maintenance and service 314 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 4, the aircraft 400 produced by exemplary method 300 may include an airframe 420 with a plurality of systems 422 and an interior 424. Examples of high-level systems 422 include one or more of a propulsion system 426, an electrical system 428, a hydraulic system 430, and an environmental system 432. Any number of other systems may be included. Although an aerospace example is shown, the principles of the disclosed embodiments may be applied to other industries, such as the automotive industry.

Apparatus and methods embodied herein may be employed during any one or more of the stages of the production and service method 300. For example, components or subassemblies corresponding to production process 306 may be fabricated or manufactured in a manner similar to components or subassemblies produced while the aircraft 400 is in service 312. Also, one or more apparatus embodiments, method embodiments, or a combination thereof may be utilized during the production stages 306 and 308, for example, by substantially expediting assembly of or reducing the cost of an aircraft 400. Similarly, one or more of apparatus embodiments, method embodiments, or a combination thereof may be utilized while the aircraft 400 is in service 312, for example and without limitation, to maintenance and service 314.

Although this disclosure has been described in terms of certain specific configurations, other configurations that are apparent to those of ordinary skill in the art, including configurations that do not provide all of the features and advantages set forth herein, are also within the scope of this disclosure. Accordingly, the scope of the present disclosure is defined only by reference to the appended claims and equivalents thereof.

What is claimed is:

1. A blind tack fastener comprising:
   a pull stem having an elongated shaft with an extended tail portion, the elongated shaft having a first outer surface with a first outer diameter, the extended tail portion having a second outer surface with a second outer diameter larger than the first outer diameter, the extended tail portion also having a fillet;
   a crush-initiating washer surrounding the pull stem, the crush-initiating washer having a head-end surface, a fillet engagement surface in contact with the fillet of the extended tail portion of the elongated shaft, an inner surface in contact with the first outer surface of the elongated shaft, and an outer surface with an outer diameter equal to the second outer diameter of the extended tail portion of the elongated shaft;
   a crush sleeve surrounding the pull stem, the crush sleeve having a head-end surface, a tail-end surface in contact with the head-end surface of the crush-initiating washer, an inner surface in contact with the first outer surface of the elongated shaft, and an outer surface with an outer diameter equal to the second outer diameter of the extended tail portion of the elongated shaft;
   a swage collar surrounding the pull stem, the swage collar having a tail-end surface in contact with the head-end surface of the crush sleeve, an inner surface in contact with the first outer surface of the elongated shaft, and an outer surface with an outer diameter larger than the second outer diameter of the extended tail portion of the elongated shaft; and
   a breakaway groove in the elongated shaft of the pull stem, the breakaway groove being located within an inner bore of the swage collar.

2. The blind tack fastener of claim 1, further comprising a plurality of lock grooves on the outer surface of the elongated shaft of the pull stem, the lock grooves being located within an inner bore of the swage collar.

3. The blind tack fastener of claim 1, wherein the pull stem comprises aluminum or an aluminum alloy having a yield strength greater than about 60 ksi and a machinability rating greater than about 40%.

4. The blind tack fastener of claim 1, wherein the crush-initiating washer comprises high-alloy steel having a yield strength greater than about 150 ksi.

5. The blind tack fastener of claim 1, wherein the crush sleeve comprises aluminum, copper or an alloy having a yield strength less than about 20 ksi and a ductility greater than about 15%.

6. The blind tack fastener of claim 1, wherein the swage collar comprises aluminum or an aluminum alloy having a yield strength less than about 20 ksi.

7. The blind tack fastener of claim 1, wherein the head-end surface of the crush-initiating washer and the tail-end surface of the crush sleeve are tapered relative to the elongated shaft.

8. A system comprising:
   a workpiece comprising a first part and a second part, the workpiece having a first hole extending through both the first part and the second part;
   a blind tack fastener comprising:
      a pull stem having an elongated shaft with an extended tail portion, the elongated shaft having a first outer surface with a first outer diameter, the extended tail portion having a second outer surface with a second outer diameter larger than the first outer diameter, the extended tail portion also having a fillet,
      a crush-initiating washer surrounding the pull stem, the crush-initiating washer having a head-end surface, a fillet engagement surface in contact with the fillet of the extended tail portion of the elongated shaft, an inner surface in contact with the first outer surface of the elongated shaft, and an outer surface with an outer diameter equal to the second outer diameter of the extended tail portion of the elongated shaft;
      a crush sleeve surrounding the pull stem, the crush sleeve having a head-end surface, a tail-end surface in contact with the head-end surface of the crush-initiating washer, an inner surface in contact with the first outer surface of the elongated shaft, and an outer surface with an outer diameter equal to the second outer diameter of the extended tail portion of the elongated shaft;
      a swage collar surrounding the pull stem, the swage collar having a tail-end surface in contact with the head-end surface of the crush sleeve, an inner surface in contact with the first outer surface of the elongated shaft, and an outer surface with an outer diameter larger than the second outer diameter of the extended tail portion of the elongated shaft; and
      a breakaway groove in the elongated shaft of the pull stem, the breakaway groove being located within an inner bore of the swage collar,
   wherein the blind tack fastener exerts a clamp-up force of at least 300 pounds on the workpiece.

9. The system of claim 8, wherein the pull stem is recessed within an inner bore of the swage collar.

10. The system of claim 8, wherein the aluminum pull stem has a yield strength greater than about 60 ksi and a machinability rating greater than about 40%.

11. The system of claim 8, wherein the blind tack fastener comprises a crush-initiating washer made of high-alloy steel having a yield strength greater than about 150 ksi.

12. The system of claim 8, wherein the aluminum crush sleeve has a yield strength less than about 20 ksi and a ductility greater than about 15%.

13. The system of claim 8, wherein the swage collar comprises aluminum or an aluminum alloy having a yield strength less than about 20 ksi.

14. The blind tack fastener of claim 1, incorporated into a workpiece comprising a first part and a second part, the blind tack fastener inserted into a first hole extending through both the first part and the second part, wherein the swage collar is in contact with the first part and a bulb formed in a portion of the aluminum crush sleeve is in contact with the second part.

15. The blind tack fastener of claim 14, wherein the blind tack fastener exerts a clamp-up force of at least 300 pounds on the workpiece.

16. The blind tack fastener of claim 1, wherein the crush sleeve is configured to form a bulb in response to the pull stem being pulled.

17. The blind tack fastener of claim 1, wherein the pull stem is configured to form a hole relative to the swage collar upon breaking of the pull stem at the breakaway groove.

18. The system of claim 8, wherein the head-end surface of the crush-initiating washer and the tail-end surface of the crush sleeve are tapered relative to the elongated shaft.

19. The system of claim 8, wherein the crush sleeve is configured to form a bulb in response to the pull stem being pulled.

20. The system of claim 8, wherein the pull stem is configured to form a hole relative to the swage collar upon breaking of the pull stem at the breakaway groove.

* * * * *